United States Patent

[11] 3,610,743

| [72] | Inventor | Frank W. Lindblom<br>Warwick, R.I. |
|---|---|---|
| [21] | Appl. No. | 18,842 |
| [22] | Filed | Mar. 12, 1970 |
| [45] | Patented | Oct. 5, 1971 |
| [73] | Assignee | Welsh Manufacturing Company |

[54] ADJUSTABLE INTERPUPILLARY DISTANCE
1 Claim, 4 Drawing Figs.

[52] U.S. Cl. .................................................. 351/107, 351/128
[51] Int. Cl. .................................................. G02c 1/04
[50] Field of Search ......................................... 351/107, 128, 5

[56] References Cited
UNITED STATES PATENTS
1,647,107 10/1927 Franchini .................... 351/128
2,315,115 3/1943 Fischer ...................... 351/128

FOREIGN PATENTS
862,087 3/1961 Great Britain .............. 351/107

Primary Examiner—David Schonberg
Assistant Examiner—Robert L. Sherman
Attorney—Barlow and Barlow ABSTRACT: An adjustable interpupillary distance spectacle frame in which the lens frame units may be moved toward and away from each other to selectively determine the interpupillary distance. Adjustment is achieved by providing a bridge member and a pair of brow portions, the brow portions interfitting into the ends of the bridge member and supporting lenses, means being provided on each of the brow portions to maintain the proper position between the brow portions and the bridge member.

PATENTED OCT 5 1971

3,610,743

INVENTOR.
FRANK W. LINDBLOM
BY

*Barlow & Barlow*
ATTORNEYS

3,610,743

ADJUSTABLE INTERPUPILLARY DISTANCE

BACKGROUND OF THE INVENTION

There are many spectacle frame constructions of an adjustable interpupillary distance type on the market, but many of the prior art devices are subject to a number of difficulties; for example, it is rather common in the prior art to utilize threaded screw type of adjustments between the bridge member and the lens frame unit one member carrying a slot and the other a threaded hole, but no provision has been made for positive interpupillary distance adjustments whereby a number of locking apertures are provided that will give one the individual interpupillary spacings as, for example, 42, 44, 46 etc. with precise and positive accuracy. An example of an early form of adjustable bridge spectacle is illustrated in Humter Pat. U.S. No. 77,287, and this exemplifies the usual form in which screws are utilized against a bridge member to lock the bridge member to the lens frame portions. Other prior art developments utilize spring detent type of adjustability in the bridge portion as, for example, in the Hawkes U.S. Pat. No. 708,141, and as late as the Gross U.S. Pat. No. 2,887,008, the thought of utilizing screw held adjustments have been adhered to.

SUMMARY OF THE INVENTION

The main object of the present invention is to provide a spectacle frame construction which is easy to adjust to the proper interpupillary distance without the exercise of more than ordinary skill. Additionally, another object of the invention is to provide a spectacle frame which permits selective determination of the interpupillary distance and which will maintain that interpupillary distance in a positive fashion in a total frame unit which is aesthetically pleasing. An ancillary object of the invention is to permit the user of spectacle fronts to maintain one unit in stock and to adjust the same for the individual user, thus assisting in the proper maintenance of inventory which is particularly important in the industrial safety spectacle field.

The spectacle frame of this invention comprises a bridge member with a pair of lens frame units that are joined to the bridge member at the brow portions thereof by the provision of a slot in the brow portions that receive a bridge member. Locking of the bridge member to the brow portions is had by providing a leaf spring with an end portion bent at right angles to the extent of the spring which end portion enters an aperture provided in the bridge member and locks the same to the brow portion. By the provision of a number of apertures as in the bridge member that are slightly spaced from each other one can readily select the proper interpupillary distance that is needed by the user of the spectacles.

DESCRIPTION OF THE PREFERRED EMBODIMENT

Figure 1:
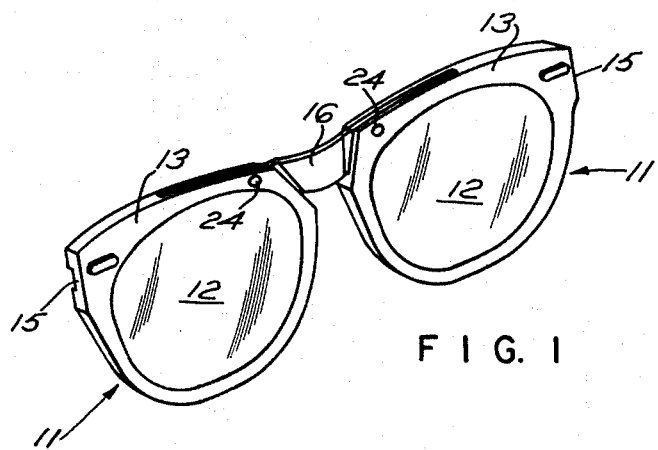
FIG. 1 is a perspective view of a spectacle frame manufactured in accordance with the invention.

The spectacle frame of the instant invention comprises a pair of lens frame units generally designated 11 which receive lenses 12 therein in known fashion. The lens frame units include brow portions designated 13 to which may be attached temples at the temple ends 15 thereof in usual fashion. The lens units are shown as having solid frames which include the brow portion 13 but as well understood to those versed in the art there may be depending from the brow portion of the frames alternate means for securing the lenses 12 thereto as, for example, by the use of eye wires and barrel connectors. The lens frame units are joined together by a bridge 16 which is fastened to the lens frame units as will presently appear.

Figure 2:
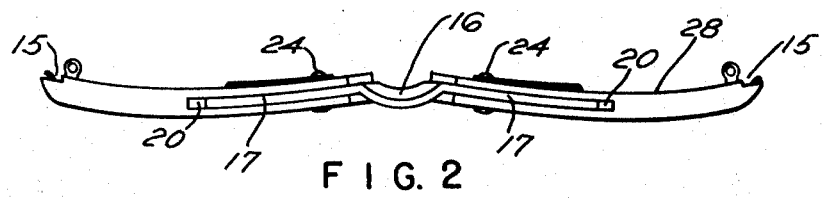
FIG. 2 is a top view thereof.
Figure 3:
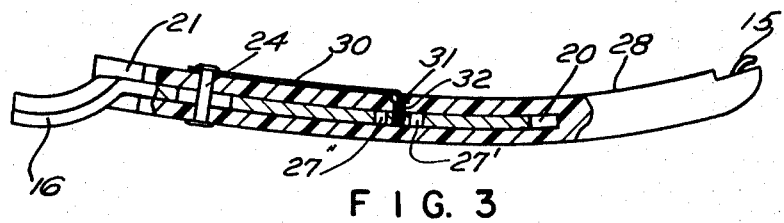
FIG. 3 is an enlarged top view of half of the spectacle frame with parts broken away to illustrate the manner in which the bridge and brow portions of the spectacle frame are interconnected.
Figure 4:
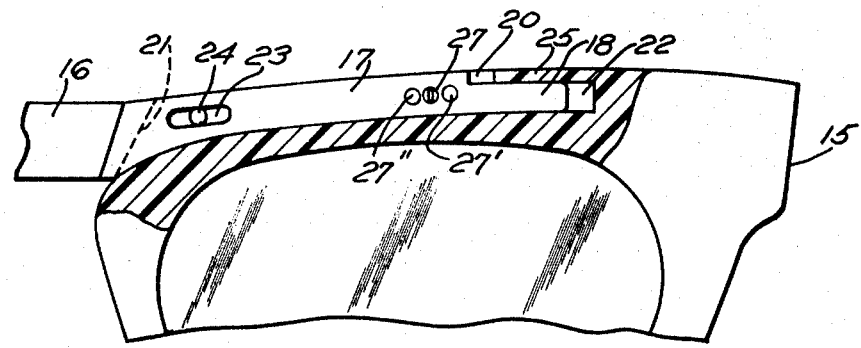
FIG. 4 is an enlarged rear view partly in section of half of the spectacle frame showing the interconnection between the bridge and the brow portion of the lens unit.

Referring to FIGS. 2 thru 4, the bridge members 16 includes an outwardly curved central portion and a pair of oppositely extending strip portions 17 that terminate in an end portion 18 of reduced cross section (see FIG. 4). The brow portions of the lens frame units are each provided with a slot 20 therein which opens at the nose pad end of the brow portions as at 21 and which in the present configuration is also open for a portion thereof to the top. The slot 20 is of reduced cross section at its intermost end as at 22 and at that location is of a configuration and cross section to accept the reduced cross section 18 of the end of the bridge member. The strip portion 17 of the bridge member is received in the slot member 20 for sliding movement therein and to retain these portions within the slot in the present embodiment, an elongated aperture 23 is provided and passing through the brow members and through the aperture 23 is a rivet 24. Since in the present embodiment the slot 20 is open to the top of the brow portion, the inner end of the slot with the reduced cross section as at 22 has an integral top wall 25 that is integral with the brow portions and this prohibits the bridge from rocking at its inner end about a pivot that would be provided by the rivet 24.

In the portion 17 of the bridge member three apertures 27, 27" and 27''' are provided (see FIG. 4). Located on the rear face 28 of the brow portions is a flat spring 30 having an inturned end 31 that is bent generally at right angles to the longitudinal extent of the flat spring. The inturned end passes through a hole 32 in the rear face of the brow portion that communicates with the slot 20 in a location to be in alignment with one of the apertures 27. The flat spring 30 is secured to the frame by the rivet 24 and in this way lies against the rear face of the lens frame unit in a most inconspicuous fashion. As shown particularly in FIG. 3, the inturned end 31 of the spring passes into one of the apertures 27 and holds the bridge member in adjusted relationship within the slot 20. It will be apparent that to adjust the interpupillary distance for each of the lens frames, it is merely necessary to lift the flat spring 30 so that its inturned end is disengaged form an aperture 27 and then physically slide the lens frame relative to the bridge member to another aperture to secure a new interpupillary distance. In the present design to maintain centralism of the frame, it is necessary to adjust the spring units on each of the lens frame units to the same degree. An aperture such as 27' (see FIG. 4), when receiving the inturned end of the spring unit, will adapt the interpupillary distance of the spectacle frame to a measurement of 42, the aperture 27 when engaged on each lens frame unit will give an interpupillary distance of 44, while the apertures such as 27" will give an interpupillary distance of 46. These three FIGS. given are the most common interpupillary distance found in the trade today, but it will be understood that if a greater range is desired it is merely necessary to provide additional apertures such as 27.

It will be accordingly understood that the interpupillary distance of the spectacle frame may be selectively determined and changed as desired by moving the lens frame units toward and away from each other and fix the same at selected positions which are in effect preselected to standard interpupillary sizes so that a single frame may be adjusted to various interpupillary distances to facilitate the stocking of one frame and adjusting the same to the particular user.

I claim:

1. An adjustable interpupillary distance spectacle frame comprising: a bridge member having a pair of oppositely extending strip portions that terminate in end portions of reduced cross section, a pair of lens frame units having brow portions, said brow portions each being provided with a slot therein which opens toward the nose pad end of sad brow portions, said slots being of a reduced cross section at their innermost ends to accept the reduced cross sectioned ends of said bridge member with a portion of the top wall of said brow portions being formed above said reduced cross sectioned end portions of the bridge thereby preventing rocking of said end portions up out of said slots, said strip portions of said bridge member each having a plurality of lateral apertures therethrough, at least two flat springs each having their integral end portions bent at right angles to said flat spring, said springs each being respectively mounted on one face of said respective brow portions with the end portions of said flat springs extending through respective apertures in the walls of said brow portions and into engagement with one of said respective apertures in said bridge strip portions to provide a positive adjustment of the bridge relative to the lens frame units.